United States Patent Office  
3,138,631  
Patented June 23, 1964

3,138,631
1-ARYLAMINO-2,4-DICYANOBUTADIENES AND
PROCESS FOR PREPARING SAME
Everett J. Frazza, Yorktown Heights, N.Y., and Lorence Rapoport, Brussels, Belgium, assignors to American Cyanamid Company, New York, N.Y., a corporation of Maine
No Drawing. Filed June 15, 1961, Ser. No. 117,264
7 Claims. (Cl. 260—465)

This invention relates to new organic compounds and more particularly is concerned with novel 1-arylamino-2,4-dicyanobutadienes which may be represented by the following general formula:

$$\text{R—N(H)—C(H)=C(CN)—C(CN)=CH}$$

wherein R is an unsubstituted carbocyclic aryl radical of less than 3 rings, preferably phenyl or naphthyl, or a carbocyclic aryl radical, preferably phenyl or naphthyl, which may carry thereon lower alkyl, lower alkoxy, hydroxy, nitro, amino and halo substituents. Suitable lower alkyl and lower alkoxy substituents contemplated by the present invention are those having up to about 6 carbon atoms. Halogen is exemplified by bromine, chlorine and fluorine.

The new compounds are prepared by reacting β-chloroacrylonitrile with a carbocyclic arylamine of the benzene or naphthalene series as specified above. Suitable arylamines which may be employed are aniline, chloroaniline, chloroaminophenol, toluidine, anisidine, chloroanisidine, phenetidine, aminophenol, phenylenediamine, diaminodiphenyl, chloroaminodiphenyl, naphthylamine, chloronaphthylamine and the like.

The reaction is preferably carried out in an inert medium at temperatures ranging from about 0° C. to 100° C. The particular reaction medium employed in the process of this invention is restricted only in that it be inert to the reactants and is preferably a solvent therefor. Any of the conventional materials, including water, generally employed in this capacity are suitable. Alcohols such as methanol, ethanol; ketones such as acetone; amides such as dimethylformamide; esters such as ethyl acetate; and the like may all be used.

The compounds of this invention have various uses. For instance, they may be polymerized with other ethylenically unsaturated monomers to give copolymers containing basic centers. Copolymers of this nature find utility in fields where basic centers are required such as in ion exchange resins, oil additives, plastics, coating, adhesive, laminating, molding and other art.

In particular, the new compounds may be polymerized with ethylenically unsaturated compounds such as acrylonitrile to give copolymers having improved dyeing properties.

The following examples will further illustrate the invention. All parts are by weight unless otherwise indicated.

EXAMPLE 1

*1-Anilino-2,4-Dicyanobutadiene*

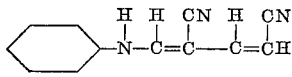

27.9 parts (0.30 mole) of aniline and 13.15 parts (0.15 mole) of β-chloroacrylonitrile are dissolved in ethanol with no appreciable exotherm occurring. After standing overnight at room temperature, a yellow precipitate initially forms and then the whole reaction mass solidifies. The mixture is slurried twice with water and filtered to give 15.2 parts of a mustard yellow product. A 0.3 part aliquot of the product is twice recrystallized from ethanol to give 0.11 part (38%) of 1-anilino-2,4-dicyanobutadiene as lemon yellow crystals melting at 124.8–125.3° C.

Calculated for $C_{12}H_9N_3$: C, 73.83%; H, 4.65%; N, 21.53%. Found: C, 73.74%; H, 4.50%; N, 21.24%.

EXAMPLE 2

*1-p-Methoxyanilino-2,4-Dicyanobutadiene*

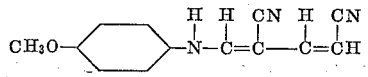

The procedure of Example 1 is repeated replacing aniline with an equivalent amount of p-anisidine. On recrystallization from ethanol, 1-p-methoxyanilino-2,4-dicyanobutadiene is obtained in the form of yellow needles melting at 130.5–131.5° C.

EXAMPLE 3

*1-p-Ethoxyanilino-2,4-Dicyanobutadiene*

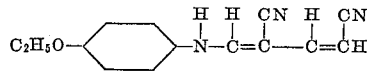

The procedure of Example 2 is repeated replacing p-anisidine with p-phenetidine. By recrystallization from ethanol, 1-p-ethoxyanilino-2,4-dicyanobutadine is obtained.

EXAMPLE 4

*1-(1-Naphthylamino)-2,4-Dicyanobutadiene*

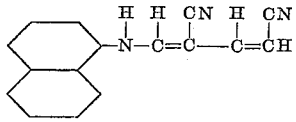

The procedure of Example 1 is repeated replacing aniline with an equivalent amount of naphthylamine to give 1-(1-naphthylamino)-2,4-dicyanobutadiene.

EXAMPLE 5

*1-p-Chloroanilino-2,4-Dicyanobutadiene*

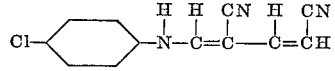

The procedure of Example 1 is repeated replacing aniline with an equivalent amount of p-chloroaniline to give 1-p-chloroanilino-2,4-dicyanobutadiene.

The preparation of 1-arylamino-2,4-dicyanobutadienes from other aromatic amines as illustrated above is readily practiced by following the above procedure employing the desired amine.

EXAMPLE 6

The following is mixed:

| | Parts |
|---|---|
| Acrylonitrile | 18 |
| 1-anilino-2,4-dicyanobutadiene | 2 |
| Benzene | 54 |
| α,α'-Azodiisobutyronitrile (polymerization catalyst) | 0.2 |

The mixture is refluxed for 1 hour. A white precipitate comprising a copolymer of acrylonitrile and 1-anilino-2,4-dicyanobutadiene forms during reflux. The mixture is cooled and filtered. The solid is washed with methanol and then ether. The solid is air dried. The yield is 5 grams (25%). The copolymer is white.

EXAMPLE 7

A sample (5 parts) of the dry copolymer of Example 6 is added to a dye bath consisting of 500 parts of an aqueous solution containing 0.2 part of sulfuric acid, 1 part of sodium sulfate and 0.2 part of Calcocid Alizarine Blue SAPG (Color Index No. 1054). The dye bath is boiled for 30 minutes, after which the polymerization product is filtered off and washed with hot water until the water is free of dye. The copolymer is dyed blue which is stable to repeated washings and is of improved dyeability as compared to pure polyacrylonitrile.

This application is a continuation-in-part of our copending and now abandoned application Serial No. 819,221, filed June 10, 1959, which is a continuation-in-part of our application Serial No. 704,908, filed December 24, 1957, and now abandoned.

We claim:
1. A 1-arylamino-2,4-dicyanobutadiene of the formula:

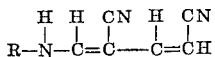

in which R is selected from the group consisting of unsubstituted carbocyclic aryl radicals of less than 3 rings and lower alkyl-substituted, lower alkoxy-substituted, hydroxy-substituted, amino-substituted and halo-substituted, said halo substituent being selected from the group consisting of bromine, chlorine and fluorine, carbocyclic aryl radicals of less than 3 rings.

2. 1-anilino-2,4-dicyanobutadiene.
3. 1-p-chloroanilino-2,4-dicyanobutadiene.
4. 1-p-methoxyanilino-2,4-dicyanobutadiene.
5. 1-p-ethoxyanilino-2,4-dicyanobutadiene.
6. 1-(1-naphthylamino)-2,4-dicyanobutadiene.
7. A process for preparing a 1-arylamino-2,4-dicyanobutadiene which comprises reacting β-chloroacrylonitrile with a compound selected from the group consisting of unsubstituted carbocyclic arylamines of less than 3 rings and carbocyclic arylamines of less than 3 rings having a substituent selected from the group consisting of lower alkyl, lower alkoxy, hydroxy, nitro, amino and halo, said halo substituent being selected from the group consisting of bromine, chlorine and fluorine, in an inert solvent at a temperature from about 0° C. to about 100° C. and recovering the resultant compound.

References Cited in the file of this patent
UNITED STATES PATENTS
2,459,420    Erickson _____ Jan. 18, 1949